Sheet 1 2 Sheets.

W. K. Miller.

Mower.

Div. A. No. 2294 Div. A. Reissued Jun. 26, 1866.

Witnesses:
A. B. Stoughton,
G. Cohen

Inventor:
W. K. Miller.

Sheet 2. 2 Sheets.

W. K. Miller.
Mower.

Div. A No. 2294 Div. A. Reissued Jun. 26, 1866.

Witnesses:
A. B. Stoughton,
L. Cohen

Inventor:
W. K. Miller

UNITED STATES PATENT OFFICE.

WILLIAM K. MILLER, OF CANTON, OHIO.

IMPROVEMENT IN HARVESTERS.

Specification forming part of Letters Patent No. 32,707, dated July 2, 1861; Reissue No. 2,294, dated June 26, 1866.

DIVISION A.

*To all whom it may concern:*

Be it known that I, WILLIAM K. MILLER, of Canton, in the county of Stark and State of Ohio, have invented certain new and useful Improvements in Harvesting-Machines; and I do hereby declare the following to be a full, clear, and exact description of the construction and operation of the same, reference being had to the accompanying drawings, making a part of this specification, in which—

Figure 1:
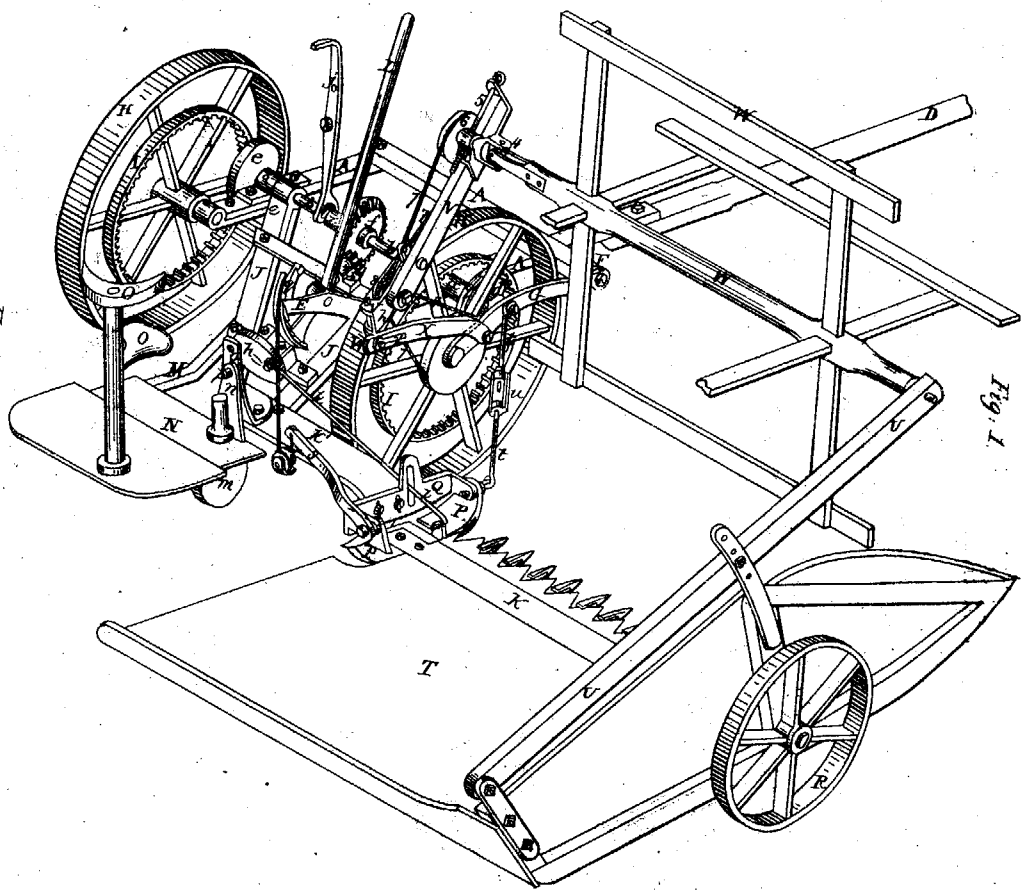
Figure 3:
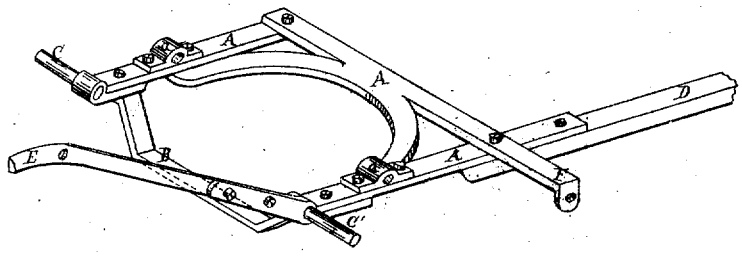
Figures 2, 4:
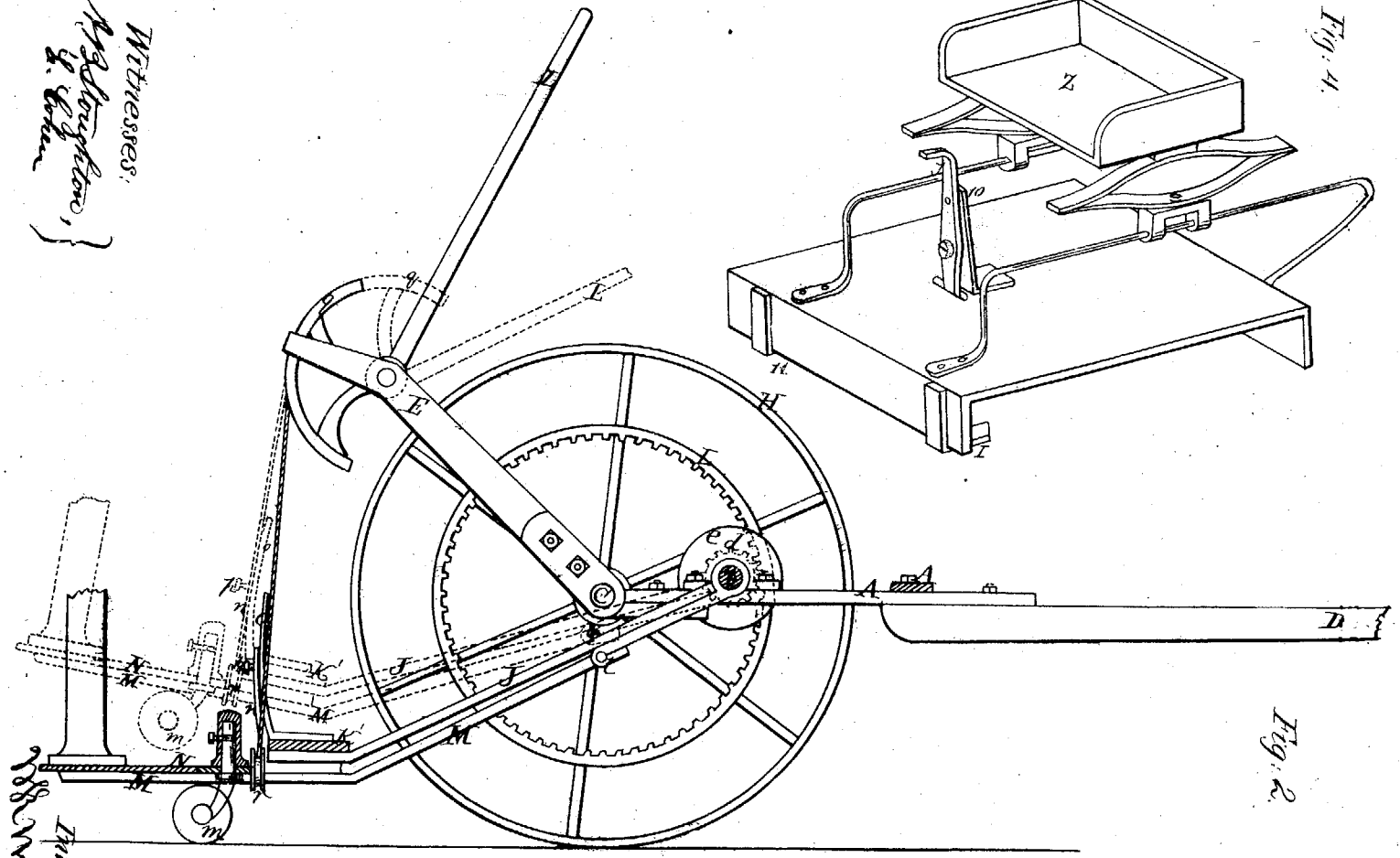

Figure 1 represents a perspective view of the machine as arranged for reaping grain, the driver's seat (shown in a separate figure) being removed to show the parts that would be concealed by it if in place. Fig. 2 represents a vertical transverse section taken close up to the platform drive-wheel, to show the arrangement of the hinged part of the main frame and its operation. Fig. 3 represents, in perspective, the main frame proper—that is, that part of the main frame that is supported and controlled by the carrying-wheels and tongue. Fig. 4 represents the driver's seat and the clutch-lever for throwing the cutter in and out of gear detached and separated from the main frame.

My harvesting-machine is designed for reaping grain as well as for mowing grass, it being convertible from one to the other at pleasure and equally applicable to both purposes; and my invention consists, first, in the location of the pulleys over which the reel-belt passes intermediate between the driving-pulley and the reel-shaft pulley and at an angle therewith, so that the belt will be kept taut however much the reel may rise and fall with the platform or cutting apparatus; and my invention further consists in the manner of passing the driving-belt from the main driving-pulley over the intermediate pulleys to the reel-shaft pulley.

To enable others skilled in the art to make and use my invention, I will proceed to describe the same with reference to the drawings.

A represents a main frame, united by a bent axle, B, or a brace near where the journals C C of the wheels are united to said frame, as seen at Fig. 3, whether said brace be the axle or otherwise, and to which frame the tongue D is rigidly fixed. There are also upon this frame boxes *a a*, in which a cross-shaft, *b*, Fig. 1, is supported and turns, to communicate motion to the cutters from the drive-wheels, or either of them. It also has a rigid arm, E, affixed to it, to which the lever is hinged that raises the finger-bar and platform, and also a short arm, F, to which a brace or bar, G, Fig. 1, is fastened by one of its ends, the other end being connected to the point of the journal C′, the object of this brace or bar being to connect the screw-buckle rod *c* to.

The driving-wheels H H are independent drivers turning loosely on the above-mentioned journals C C′. They have gear-wheels I I attached, which gear with and turn the pinions *d* on the shaft *b* when the machine is drawn forward; but when the machine is backed the shaft *b* does not turn, there being ratchets and pawls fixed in the drums *e*, so that the pinions may turn without the shaft, in the usual well-known manner.

At about the center of the shaft *b* there is a bevel-gear, *f*, which turns a bevel-pinion, *g*, on a shaft that carries the crank-wheel *h*.

A sleeve or boss, *i*, is connected with the bevel-gear *f*, and to the shaft *b* by a feather and groove, so that, by means of a lever, *j*, which straddles the sleeve and extends up toward the driver's seat, the driver may at pleasure throw said gear *f* in or out of connection with the pinion *g*. From the crank-wheel *h* there extends a pitman, *k*, which connects with and gives motion to the cutter-bar and cutters.

To the shaft *b* are hinged two frame-pieces, J J, which extend rearward and are bolted to the finger-bar K, or a prolongation of it, K′, so that the finger-bar, in rising and falling, swings around the shaft *b* as a center, said shaft being forward of the bearings or journals of the drive-wheels, and, having a longer radius than they could have if hung to the journals or axles of the drive-wheels, can be more easily raised, with less swing of the lever L than though they were hung shorter. The shaft that carries the bevel-pinion *g* and crank-wheel *h* is supported on these frame-pieces J J so that the pinions can roll around the bevel-gear *f* and still mesh with it, as the shaft *b* is the common center of all the parts.

To the under side of the frame-pieces J J at *b*, Fig. 2, are hinged two bars, M M, which extend rearward, and to which the foot-board N and the raker's support or stand O are fastened, and which may have a caster, *m*, underneath them, to keep them off the ground, and an upright, *n*, which may be adjusted and fastened to the upright *o* on the finger-bar; or if the pin or bolt *p* be removed, then the raker's stand and the finger-bar can move independent of each other in a vertical line. The lever L is pivoted to the arm E, and has a grooved arc, *q*, upon it, and rack-teeth to hold it in any fixed position.

To the arc *q* is fastened a cord or chain that passes under a roller, *r*, and thence to a lever, *s*, which is connected to the shoe P, so that the driver when occupying his seat can, by means of this lever, raise up or let down the platform, cutters, and other connected parts, at pleasure, a hinge joint being provided between the shoe P and the shoe-plate Q for this purpose, and the finger bar being bolted to the shoe P, and the brace-bar K′ to the shoe-plate Q, admits of this movement. The shoe and shoe-plate attachment and hinge are the same as that patented to me heretofore, and need not be here further described.

The suspension or tension rod *t* is connected to the front of the shoe, and extends up and has its upper end fastened to the brace G. In this rod *t* there is a screw-buckle, *u*, by which the point of the shoe may be raised or lowered and held at any desirable height.

R is the outside supporting-wheel, S the outside divider, and T the platform; U the outer reel-support, and V the inner one, for supporting the reel W. The outer reel-post is rigid, but adjustable; the inner one, V, is pivoted at *v* to a nut or block, *w*, that is adjustable in the slot *x* of the arm X, and the reel-post is made further adjustable by the pin 2 and the slot 3 of the plate *z*, by which it is pivoted to the nut *w*.

There is a gimbal-joint at 4, where the reel-shaft is supported to the inner reel-post, V, and this support is made adjustable by the screw-rod 5.

On the end of the reel-shaft there is a pulley, 6, around which a belt, 7, passes, and thence around a pulley, 8, near the joint of the hinged reel-support V, and thence around a pulley, 9, on the hub of the driving-wheel, from whence the reel is driven. By this arrangement the platform or finger-bar and cutters may rise and fall while the reel will swing to admit of this movement, and the belt, crossing the joint between the platform and main frame, will continue to drive the reel.

Z is the driver's seat. Its position on the machine-frame will be readily understood by the position of the lever *j* on the main frame and the same lever shown in connection with the seat in Fig. 4. There is a hole in the lever *j* that sets over a pin in the upright 10 when the wheel *f* is in gear with the pinion *g*, and hooks 11 catch under the front of the main frame to hold the seat firmly to its place.

By placing the shaft *b* in advance of the bearings of the drive-wheels the power of said drive-wheels upon the pinions on said shaft tends to prevent the drive-wheels from slipping, while the contrary effect would take place if the shaft and pinions were behind the line of bearings of the drive-wheels.

The swinging reel-support V turns on the pin or pivot *v*, and can move back and forth past the joint between the platform and main frame, and the universal joint 4 in the reel-shaft admits of this motion without in anywise cramping or binding the reel.

What I claim under this invention, and desire to secure by Letters Patent, is—

1. The pulleys at or near the lower end of the inner reel-support, for the purpose specified.

2. The single endless belt or chain passing from the driving-pulley *g* on the main frame to and over intermediate pulleys placed to one side of a vertical plane, passing through said driving-pulley, and thence to and over the pulley on the inner end of the reel-shaft, substantially as and for the purpose described.

W. K. MILLER.

Witnesses:

A. B. STOUGHTON,
EDM. F. BROWN.